(No Model.)
L. P. BURDICK.
ICE CREAM FREEZER.
No. 477,184. Patented June 14, 1892.
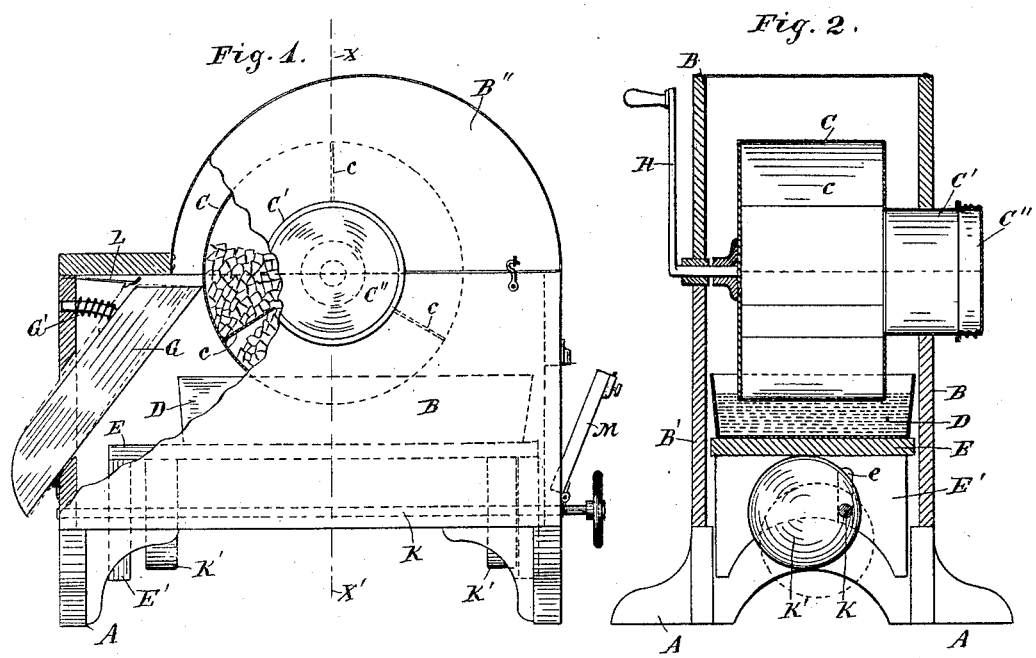
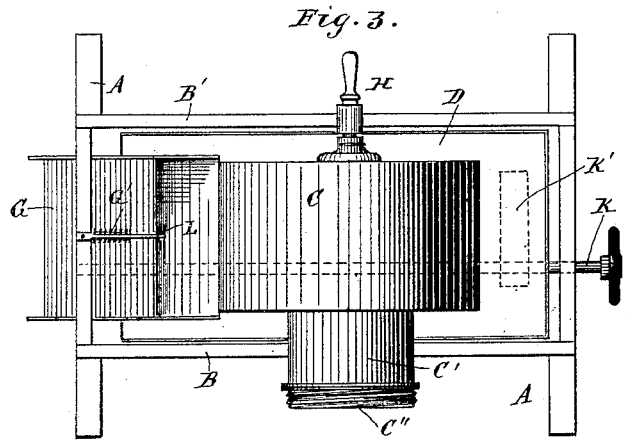
Witnesses.
A. H. Opsahl
E. F. Elmore
Inventor.
Lindon P. Burdick
By his Attorney.
Jas. F. Williamson

UNITED STATES PATENT OFFICE.

LINDON P. BURDICK, OF MINNEAPOLIS, MINNESOTA.

ICE-CREAM FREEZER.

SPECIFICATION forming part of Letters Patent No. 477,184, dated June 14, 1892.

Application filed November 17, 1891. Serial No. 412,219. (No model.)

*To all whom it may concern:*

Be it known that I, LINDON P. BURDICK, a citizen of the United States, residing at Minneapolis, in the county of Hennepin and State of Minnesota, have invented certain new and useful Improvements in Ice-Cream Freezers; and I do hereby declare the following to be a full, clear, and exact description of the invention, such as will enable others skilled in the art to which it appertains to make and use the same.

My invention relates to that class of ice-cream freezers known as "peripheral freezers," and has for its object to provide a more convenient and serviceable machine of this class.

To this end the invention consists of certain novel devices and combinations of devices, which will be hereinafter fully described, and particularly pointed out in the claim.

A machine embodying my invention is illustrated in the accompanying drawings, wherein, like letters referring to like parts throughout—

Figure 1 is a side elevation of the machine, some parts being broken away. Fig. 2 is a vertical section of the same on the line X X' of Fig. 1, and Fig. 3 is a plan of the machine with the cover removed.

A is the base, and B B', respectively, the right and left side plates constituting the frame of the machine. B'' is a removable cover for the same.

C is the refrigerant-cylinder on the periphery of which the cream is frozen.

D is the cream-pan.

E is a vertically-movable support or false bottom, on which the cream-pan rests, and G the scraper-spout for removing the frozen cream from the periphery of the cylinder.

At its left side the cylinder is provided with an ordinary journal, to which the crank-handle H is applied. On its right side the cylinder is provided with an enlarged and hollow journal C', having its interior continuous with the interior of the cylinder. This hollow journal C' extends through the right-side plate B of the frame, and is provided with a removable cap C'' for closing the outer end of the same. This enlarged and hollow journal, with its removable cap, serves as a means of admitting the refrigerant material into the interior of the cylinder without affording any joint or leaving any possibility of leakage from the cylinder into the cream-pan. This construction of the cylinder with a hollow journal and removable end cap located outside the frame is one of the important features of improvement in my machine.

The cylinder is provided on its interior with radial blades or partitions c, extending inward a short distance from the periphery. The radial wings or blades serve to hold the ice or other refrigerant material against the periphery of the cylinder when in motion and prevent the melting of the cream at the top of the cylinder.

It is desirable to adjust the support E for the cream-pan by an equable motion, so that the cylinder will make a uniform dip throughout the length of the pan and be adjusted vertically to different heights to give a constant or approximately a constant dip to the refrigerant-cylinder as the cream is fed therefrom. For this purpose I provide a hand-shaft K, having eccentrics or cams K' in position to work on the under side of the support near its opposite ends. Hence by the movement of the shaft the support and cream-pan may be adjusted at will. As shown, the hand-shaft works through slots e in brackets or foot-boards E', attached at the opposite ends of the support. The side plates of the frame, together with the slots e, in cooperation with the hand-shaft, serve to guide the support and hold the same level in its upward movement by the eccentrics or cams. This construction for moving the support of the cream-pan is another feature of my improved machine.

The scraper-spout G is under spring-tension from spring G', which normally holds the edge of the scraper against the periphery of the cylinder. I have found by actual practice, however, that it is not desirable to scrape off the frozen cream continuously, but that much better cream may be obtained in less time by intermittently applying the scraper. To provide a convenient device for this action of the scraper, I place a spring-catch L in position to engage over the back edge of the scraper when the same is forced away from the cylinder and hold the same out of contact therewith until the latch is raised. The operator, turning the crank with one hand, can conveniently operate the scraper with the other, as may be required, alternately engaging and disengaging the same from the latch. This arrangement of the scraper permits several revolutions of the wheel to be made without removing the frozen cream. Hence for these two or three revolutions the wheel may be moved rapidly, increasing the centrifugal force, so that the refrigerant material will stick to the inside of the peripheral wall of the cylinder. This greatly increases the efficiency of the machine, as before stated.
M is a hinged door at one end of the frame for the removal of the cream-pan.

The operation and advantages of the machine have been fully stated in connection with the description of the parts.

What I claim, and desire to secure by Letters Patent of the United States, is as follows:

In an ice-cream freezer, the combination, with the refrigerant-cylinder, of the cream-pan, a vertically-movable support under said pan provided with depending parts working in guideways at their lower portions and provided near their upper portions with vertical slots, and the shaft working through the said vertical slots and provided with a pair of eccentrics or cams working one under and against each end of said support, substantially as and for the purpose set forth.

In testimony whereof I affix my signature in presence of two witnesses.

LINDON P. BURDICK.

Witnesses:
JAS. F. WILLIAMSON,
EMMA F. ELMORE.